United States Patent [19]

Mohsin

[11] 4,307,918
[45] Dec. 29, 1981

[54] BEARINGS

[75] Inventor: Mohamed E. Mohsin, Manchester, England

[73] Assignee: National Research Development Corporation, London, England

[21] Appl. No.: 39,440

[22] Filed: May 15, 1979

[30] Foreign Application Priority Data

May 17, 1978 [GB] United Kingdom ............... 20298/78

[51] Int. Cl.$^3$ .......................................... F16C 32/06
[52] U.S. Cl. ...................................... 308/9; 308/122; 308/170; 308/5R
[58] Field of Search ................... 308/9, DIG. 1, 5 R, 308/122, 3 A, 170, 3 R

[56] References Cited

U.S. PATENT DOCUMENTS

| | | | |
|---|---|---|---|
| 3,347,605 | 10/1967 | Dreyfus et al. | 308/122 |
| 3,640,590 | 2/1972 | Beisemann | 308/9 |
| 3,751,118 | 8/1973 | Arneson | 308/5 R |
| 3,981,546 | 9/1976 | Sperman | 308/5 R |

FOREIGN PATENT DOCUMENTS 2845580  4/1979  Fed. Rep. of Germany ... 308/DIG 1

*Primary Examiner*—Lenard A. Footland
*Attorney, Agent, or Firm*—Cushman, Darby & Cushman

[57] ABSTRACT

A hydrostatic bearing with structural features to improve the harmony between hydrostatic and hydrodynamic forces set up in the bearing fluid, and to diminish the harmful effects of hydrodynamic forces when there is relative motion between the bearing members. These features may comprise channels in the bearing land to maintain transverse hydrostatic fluid flow beneath the land despite longitudinal dynamic forces, longitudinal channels in the bearing surfaces to diminish dynamic friction without unduly diminishing the resistance to hydrostatic fluid flow across these channels, and means to guide fluid recirculation within the bearing recess so as to avoid shearing contact between oppositely-moving streams of fluid within it.

17 Claims, 11 Drawing Figures

BEARINGS

This invention relates to hydrostatic bearings, by which term we mean bearings comprising two members, one of which carries or is formed with a recess. In use this recess is connected to a source of externally pressurized fluid and the surface of the member immediately around the edge of the recess, known as the "land", confronts a surface presented by the other member, the two surfaces being separated by a clearance filled by a thin film of fluid that escapes continuously from the recess because source pressure is above ambient. Such bearings are well known, and the characteristics of known and typical bearing fluids offer the promise of low friction relative dynamic movement between the two members in directions parallel to the faces of the film, and of high stiffness and capacity to withstand loads in the perpendicular direction. Such bearings may for instance be of linear kind, in which the relative movement between the two members takes place along a line or within a plane, or of rotary kind in which the relative movement is rotary. In rotary bearings the reaction between the two members may be radial or axial, or indeed both.

Unfortunately these promises have been only imperfectly fulfilled in many known bearings, for the general reason that these bearings have been so constructed that the hydrodynamic and hydrostatic forces acting upon the fluid in use have in some respects been incompatible, or in opposition to each other. By hydrodynamic forces we mean those exerted on the fluid by reason of the friction of adjacent, relatively-moving surfaces against it; this friction gives rise to a drag force acting upon the fluid, or shear forces within the fluid, and the flow induced in the fluid by this force will be referred to as hydrodynamic flow. By hydrostatic forces, we mean those which are due to the difference between the hydrostatic pressure of the fluid within the recess and the ambient pressure outside the bearing clearance.

This incompatibility or opposition between the hydrodynamic and hydrostatic effects can occur in various ways, of which three will now be described by way of example with reference to FIG. 1 of the accompanying drawings, which is a diagrammatic longitudinal section through a typical linear hydrostatic bearing, and to FIG. 2 which is a velocity diagram related to the same bearing. In FIG. 1 numerals 1 and 2 denote the two members of the bearing and recess 3, formed in member 1, is supplied with fluid under pressure from a pump 4 by way of a resistance 5 and a conduit 6; in some applications the resistance would normally be controlled, in others fixed. The edges of recess 3 are surrounded by a raised "land" 7. In use the surface of this land lies parallel with but spaced from the surface 8 of member 2, the clearance 9 between these two surfaces being filled by a thin and moving film of fluid. Ambient pressure exists in the deeper space 10 that exists between members 1 and 2 outside clearance 9. In use, let it be assumed that member 1 is stationary, and that member 2 can move relative to it in the directions of motion, which may be considered as longitudinal relative to the bearing, indicated by arrows 11 and 12 respectively. Land 7a may be referred to as the forward land and land 7b as the rearward land, while land 7c and the remaining land 7d not shown in FIG. 1 will be referred to as the transverse lands. The same adjectives may be used to refer to the clearances beneath these lands. In all the Examples to be described, member 2 is moving in direction 12; reversal to direction 11 would simply reverse other operational characteristics as one would expect.

The first manner in which the opposition between the hydrostatic and hydrodynamic forces may affect the performance of the bearing concerns the clearance 9 beneath forward land 7a. The hydrostatic flow of fluid over this land will always tend to be in an outward and thus a forward direction, but the drag caused by the movement of surface 8 induces a backwards hydrodynamic flow.

The two flows will therefore be opposed beneath land 7a and if the hydrodynamic effect is the greater there will be a danger of fluid starvation which may lead to metal-to-metal contact between the confronting surfaces and possibly to cavitation affecting the fluid within the recess. A tried but primitive method of avoiding such starvation is simply to provide a source of fluid whereby the surface of member 2 is kept "wet" with excess fluid immediately in front of land 7a.

The second manner in which incompatibility between the hydrostatic and hydrodynamic effects may impair the performance of the bearing concerns those parts of the fluid film where the natural hydrostatic flow is substantially at right angles to the direction of motion indicated by arrows 11 and 12, that is to say the clearances beneath lands 7c and 7d in the example of FIG. 1. The surface area of lands 7c and 7d, and thus of the fluid films in the clearances beneath them, can be considerable. The depth of these clearances should be kept small, for the sake of the stiffness of the bearing. Unfortunately a fluid film of high surface area and slight but uniform depth suffers much internal shear when there is relative movement between the surfaces to either side of it, resulting in serious friction and generation of heat. Hitherto the customary way of dealing with this problem has been to use powerful equipment to cool the fluid and to propel member 2: such equipment can be bulky and expensive.

The third manner in which the performance of the bearing may be impaired by hydrodynamic effects concerns the fluid-filled volume within recess 3 itself. The hydrostatic forces upon this fluid tend simply to force it first downwards and then outwards through clearance 9. During relative movement of members 1 and 2 however, the hydrodynamic forces acting upon the recess fluid set up by the frictional drag of surface 8 cause the fluid in the lower part of the recess to travel rearwards (arrow 13). When this moving fluid meets rear wall 4 some turbulence (15) and heat will be generated as it is forced to change direction abruptly and travel back by an upper path (arrow 17). The fluid movement thus becomes a complete circulation within the recess, with a substantial interface 19 between paths 13 and 17. As FIG. 2 shows best, this interface typically lies only about one-third of the distance between surface 8 and the top of the recess. The velocity profiles of the fluid in the two paths 13 and 17 are represented graphically by the areas 20 and 21, which are substantially equal, and the heat generated by the severe shearing between the two flows at interface 19 must be absorbed within those two flows. This imposes a particularly severe heat gradient problem upon flow 13 since it is only about half as thick as flow 17. A further problem arises from the abrupt change of direction imposed on flow 13 by impact with wall 14: this leads to a pressure variation along the length of recess 3 as shown typically by graph 22 in FIG. 2, the pressure being high against wall 14 and relatively low against forward wall 18. If the relative motion between members 1 and 2 is particularly severe the pressure against wall 18 may be in danger of falling below ambient (graph 23), leading to cavitation.

Such hydrodynamic problems are of course compounded by the desirability, from hydrostatic considerations, of making recess 3 as small as possible to make the bearing stiffness as high as possible. In addition to all these effects, further heat is generated wherever the dynamic circulatory motion is in opposition to the normal downward and outward flow of fluid due to the hydrostatic forces and once again the traditional manner of treating all such problems has been to use powerful cooling equipment.

According to the present invention a hydrostatic bearing is formed with structural features to improve the harmony between hydrostatic and hydrodynamic forces set up in the bearing fluid and diminish harmful effects of hydrodynamic forces when there is relative motion between the bearing members. These structural features may comprise forming the land, at least at the forward end of the recess, with intermeshing channels each open at one end and of two kinds, the channels of each kind lying generally parallel to the direction of motion, the open ends of the first kind of channel communicating with the recess and of the second kind of channel with ambient pressure. Fluid from the recess which enters the bearing clearance by way of channels of the first kind will tend to seek ambient pressure by a generally transverse movement from the first kind of channels to the second, rather than by purely longitudinal movement towards the outer edge of the land.

Channels of the first and second kinds may be disposed alternately across the width of the land. Where the bearing is of linear kind, the open ends of the second channels may communicate with the ambient atmosphere directly downstream of and coplanar with the bearing clearance. With a journal bearing the recesses may be supported by either the inner member (e.g. a shaft) or the outer member (e.g. a surrounding housing), and the channels of the second kind may be connected to ambient pressure by way of a manifold formed within the appropriate member. There will usually be at least three recesses disposed symmetrically around the axis of such a bearing.

The structural means to improve the harmony of hydrodynamic and hydrostatic forces upon the bearing fluid may also comprise grooves formed in at least one of the confronting faces of the bearing, these grooves being aligned with the direction of motion. Thus for an improved linear bearing longitudinal grooves may be formed in the transverse lands, or in the surfaces that confront them; for a journal bearing the grooves may be formed around the cylindrical wall of either or both members of the bearing, and for a rotating thrust bearing grooves substantially concentric with the axis of rotation may be formed on an end face of the shaft or on the confronting face of the other member of the bearing, or on both such faces. The grooves are spaced apart in the direction of hydrostatic flow, so that each groove is separated from the next by a strip of ungrooved surface. The effective clearance of the bearing, and thus its resistance to hydrostatic flow and so its stiffness and load-bearing capacity, is largely determined by the clearance between these strips and the opposite clearance surface, whereas the deeper grooves provide space for the bearing fluid to move in response to the hydrodynamic forces thus diminishing frictional and shearing losses.

The means to diminish the harmful action of hydrodynamic effects upon the essential hydrostatic mode of operation of the bearing may also comprise a guide element disposed so that fluid set in motion within the recess by dynamic effects is caused to recirculate in a manner which avoids substantial contact between substantial masses of fluid moving in opposite directions. The guide element may comprise a recirculation conduit, exterior to the recess, whereby fluid moved by dynamic effects from one longitudinal end of the recess toward the other may be returned to the first end. Alternatively the guide element may comprise a baffle mounted within the recess itself. The recess may also be formed with streamlining features to match the circulation which the dynamic effects tend to set up in the fluid, and so avoid sharp changes of direction and resulting turbulence.

The invention will now be described, by way of example, with reference to the further accompanying diagrammatic drawings in which.

Figure 1:
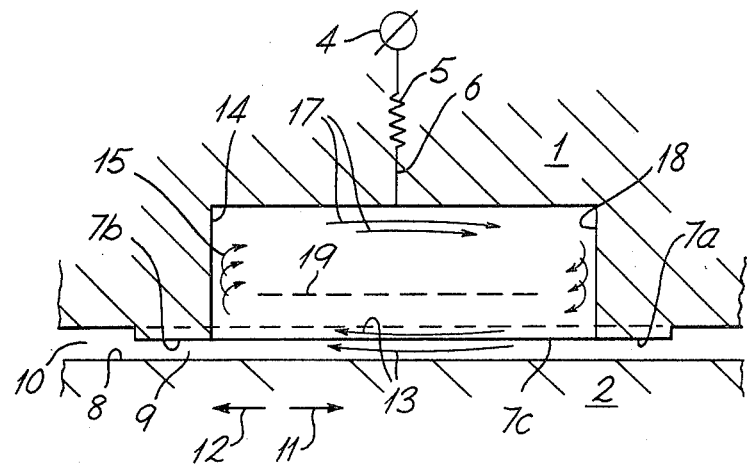
FIG. 1 is a linear hydrostatic bearing.
Figure 3:
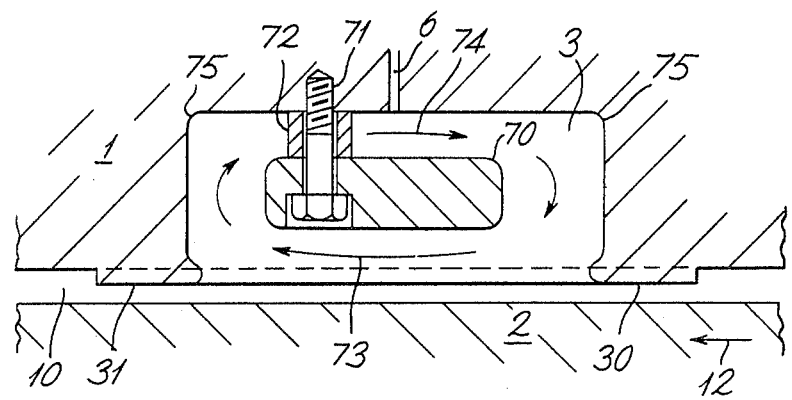
FIG. 3 is a section through a linear bearing according to the invention.
Figure 4:
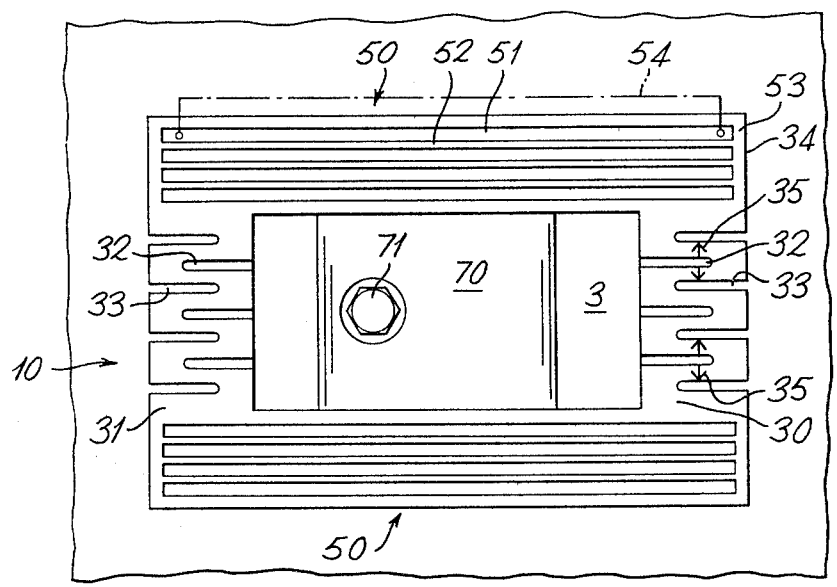
FIG. 4 is an underneath plan of the member 1 shown in FIG. 3.

The bearing of FIGS. 3 and 4 is basically similar to that of FIG. 1 in that it comprises two members 1, 2 intended for relative movement as already described, and a bearing recess 3 formed in member 1 and supplied with fluid from a pump 4 by way of a resistance 5 and conduit 6. However the bearing of FIGS. 3 and 4 contains several features according to the present invention, by which harmful influences of hydrodynamic effects upon the essential hydrostatic operation of the bearing are diminished.

Firstly the forward and rearward lands 30, 31 are no longer formed with plain, flat faces. Instead blind ended channels 32, 33 are formed in them. The open ends of alternate channels 32 are in communication with recess 3, while the open ends of the other set of alternate channels 33 are open to the ambient pressure that exists in space 10 beyond clearance 9. Channels 32, 33 are of such length that there is considerable longitudinal overlap between them (see FIG. 3). Now, when the hydrostatic head of pressure within recess 3 causes fluid to enter channels 32 in search of a region of lower pressure, the fluid will no longer attempt to continue to travel only in a longitudinal direction towards the boundary 34 of the land. Instead the fluid will tend to take the shorter and generally transverse route (indicated by arrows 35) towards the nearest overlapping channels 33. Because of the simultaneous effect of the longitudinal drag-induced hydrodynamic forces upon the film of fluid in the clearance 9 the resultant direction of the flow between channels 32 and 33 will not be exactly transverse, but will be the vector addition of two components of flow, one longitudinal and the other transverse. Provided the channels 32 and 33 are close enough to each other transversely and overlap each other enough longitudinally, a sufficiently unbroken film should be maintained in the clearance under land 30 to ensure efficient operation of the bearing when surface 8 is moving in the direction of arrow 12, and under land 31 during reverse motion.

Figure 5:
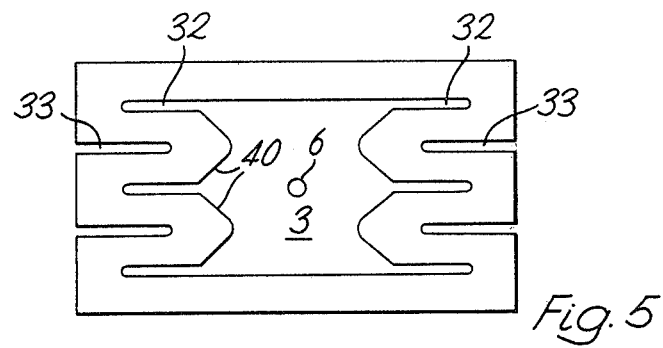
FIG. 5 is an underneath plan of an alternative recess.

In the modified construction of recess 3, shown in FIG. 5, the mouths of channels 32 do not open into a plain end wall of the recess, but that wall is formed with noses 40 which project into the recess between adjacent channels 32 so as to provide those channels in effect with tapering mouths. Channels 32 and 33 again overlap longitudinally, and transverse flow again takes place between them.

Figure 6:
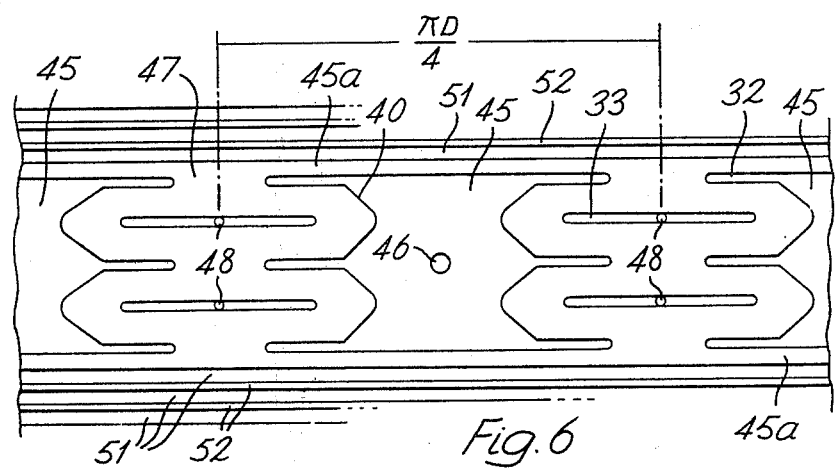
FIG. 6 is a developed elevation of recesses as arranged in a journal bearing.

FIG. 6 illustrates an application of the invention to a journal bearing, and is a diagrammatic and developed view of part of the inner face of an annular bearing for supporting a rotating shaft. Four hydrostatic bearing recesses 45, fed with fluid under pressure by conduits 46, are formed in the inner cylindrical face 47 of the bearing; in practice a minimum of three recesses would be needed for radial stability. The ends of the recesses are formed with channels 32 and 33 and with noses 40 as in FIG. 5, and channels 32 and 33 overlap as before. Each set of channels 33 overlaps at one end with one set of channels 32, and at the other end with another set of channels 32 from the adjacent recess. Channels 33 are connected to ambient pressure by radial ducts 48.

Figure 7:
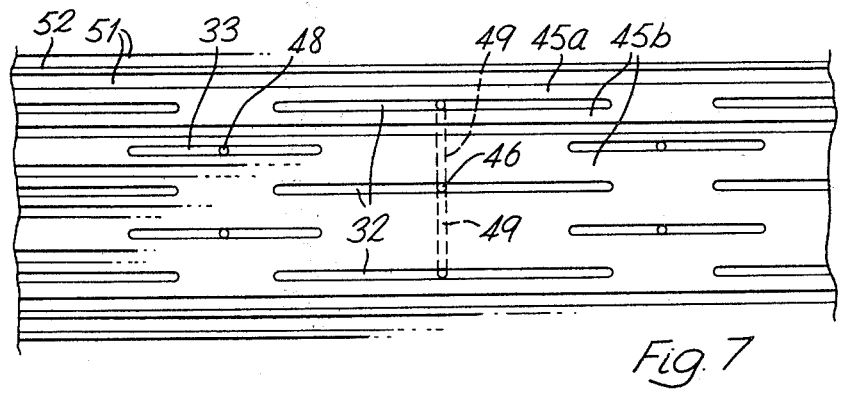
FIG. 7 is similar to FIG. 6 but shows an alternative arrangement.

In the alternative form of journal bearing shown in FIG. 7 the arrangement of channels 33 and ambient pressure conduits 48 is as in FIG. 6, but the recesses are now constituted not by chambers of considerable surface area, but by sets of three parallel channels 32, connected by ducts 49 to the high-pressure conduit 46.

Figure 8:
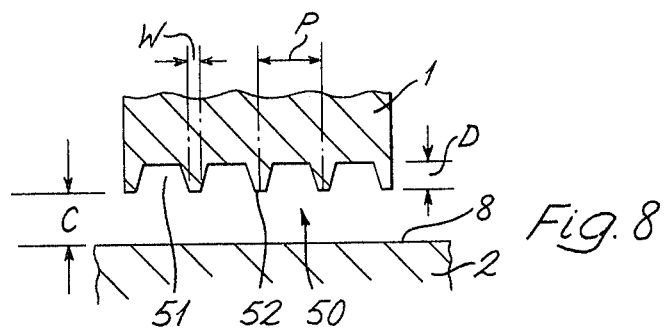
FIG. 8 is a transverse section through one of the transverse clearances of a bearing.
Figure 9:
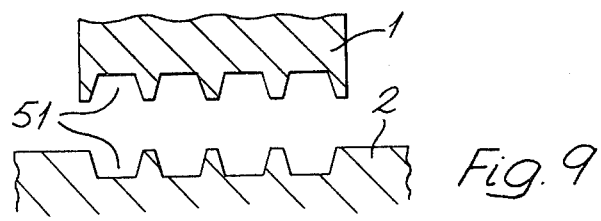
FIG. 9 is similar to FIG. 8 but shows an alternative arrangement.
Figure 10:
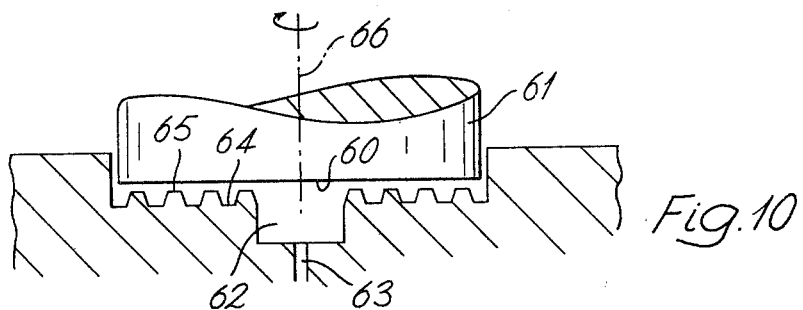
FIG. 10 is an axial section through a thrust bearing.

Another feature of the invention which distinguishes the bearing of FIGS. 3 and 4 from that of FIG. 1 is that the transverse lands 50, instead of being simply flat like lands 7c and 7d, are formed with channels 51 running parallel to the direction of motion. As FIG. 8 shows more clearly, the channels 51 are trapezoidal in section, and are separated from each other by flat lands or crests 52. It is within the scope of the invention that the channels could be of other section, for instance triangular or part-circular, and that instead of being formed in the lands of member 1 to confront the flat surface 8 of member 2 the reverse arrangement is possible in which the channels are formed in member 2. Indeed as FIG. 9 diagrammatically illustrates, channels such as 51 could be formed in the confronting surfaces of both members; in such a case the crests of the two sets of channels should be in register with each other. It will be appreciated that this aspect of the invention could be applied to journal bearings by forming similar channels 51 peripherally in the lands 45a of the bearings shown in FIGS. 5 and 6 and in the clearances 45b that lie axially between channels 32, 33. FIG. 10 illustrates the application of this aspect of the invention to a thrust bearing in which the end face 60 of a rotating shaft 61 confronts a thrust face containing a central recess 62 fed from a conduit 63, and concentric channels 64 separated by flat crests 65. Since channels 65 are concentric with the axis of rotation 66 of shaft 61, they lie parallel to the effective direction of relative motion of shaft 61 and face 62.

It will be seen that while channels 64 of FIG. 10 are circular and endless, channels 51 of the linear bearings of FIGS. 3, 4, 8 and 9 need to be blocked at their longitudinal ends 53 to avoid providing an easy escape to ambient pressure for fluid that has entered the transverse clearances of the bearing. Quantities D, C, W and P are indicated in FIG. 8, and apply in principle to this aspect of the invention generally. Tests suggest that the crests (52, 65) should be parallel with the confronting surface, and that the width W of each crest may with advantage be of the order of one-tenth of the pitch P between adjacent channels. If P is of the order of 1.0 to 2.0 mm, as is typical, then the impedance to sideways transverse hydrostatic flow in FIGS. 8 and 9, and radial hydrostatic flow in FIG. 10 offered by a clearance C may be no less than the impedance that would be presented by a clearance of about 1.5C were the opposed surfaces both flat as in FIG. 1. On the other hand the friction due to fluid shear is substantially reduced, to a value comparable with the ratio between the total plan area of all the crests and the total plan area of the channelled surface. Thus a substantial reduction in friction may be obtained at the expense of a drop in impedance and a relatively slight drop in load-bearing capacity which it will be easier to compensate for by other design modifications.

Figure 2:
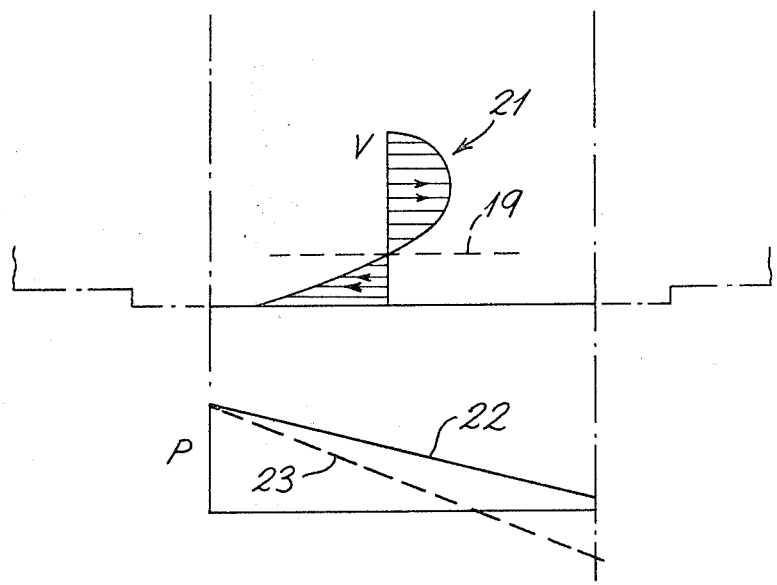
FIG. 2 is a velocity diagram related to FIG. 1.

Another feature shown in FIGS. 3 and 4 contributes to the invention by diminishing the harmful influence of hydrodynamic effects upon the proper hydrostatic operation of the bearing. The essential item of this feature is a baffle 70, supported centrally within recess 3 by screws 71 and spacers 72, one example of each of these being shown. Where member 2 is moving in the direction of arrow 12, baffle 70 now divides the opposed drag-induced circulatory flows 73 and 74 within the recess so that they are no longer in direct contact like flows 13 and 17 were. The height of baffle 70 within the recess should of course be matched to the level of interface 19 (FIGS. 1,2). The consequent shearing action and generation of heat is therefore avoided. In addition corners 75 are rounded and the edges of the end lands 30, 31 are also rounded to diminish sharp changes of direction and consequent turbulence. In the alternative apparatus shown diagrammatically in FIG. 11 the baffle 70 is replaced by a conduit 76, external to recess 3 but formed in member 1, this conduit permitting, as indicated by arrows 77, the fluid to circulate under the influence of dynamic forces without shearing contact between opposed flows. This construction has the result that substantially all the dynamic flow within recess 3 is in one longitudinal direction only, indicated by arrows 77.

Figure 11:
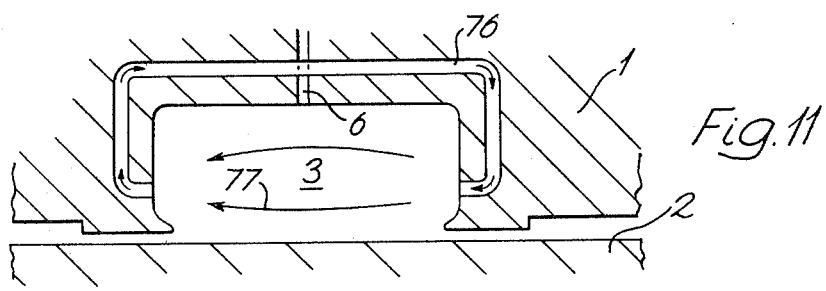
FIG. 11 is a section through another bearing recess.

If the form of the invention shown in FIG. 11 were applied to the form of recess shown in FIG. 5 or used in the journal bearing of FIG. 6, the ends of conduit 76 could be branched and an individual branch could connect with each channel 32. The circulation principle just described could also be applied elsewhere in hydrostatic bearings: for instance if channels 51 (FIG. 3) are very long or deep so that they carry a substantial volume of fluid, ducts 54 (FIG. 3) might usefully connect the two ends of each channel to permit circulation.

I claim:

1. A hydrostatic bearing comprising:
two co-operating bearing members;
a bearing recess formed in one of said members;
a land surrounding said recess;

channels formed at least in said land located at the forward end of said recess;

said channels being of first and second kinds, each being open at one end lying parallel to the direction of relative motion of the two said members;

said channels running in opposite direction so that the said open ends of said first channels communicate with said recess and the said open ends of said second channels communicate with a zone of ambient pressure;

an overlap region between said first and second channels whereby fluid may travel from said first channels to said second channels by a generally transverse path.

2. A hydrostatic bearing according to claim 1 in which said first channels alternate with said second channels across said land.

3. A hydrostatic bearing according to claim 1 in which said channels are formed on both the forward and rearward said lands of said member formed with said recess.

4. A hydrostatic bearing according to claim 1 in which said recess and said first channels are formed so that the mouths of said first channels into said recess are flared.

5. A hydrostatic bearing according to claim 1 including a manifold, by means of which said second channels communicate with said zone of ambient pressure.

6. A hydrostatic bearing according to claim 1 including guide means cooperating with said bearing recess, whereby circulatory movement of said fluid within said recess due to friction due to said relative motion of the two said cooperating bearing members is conducted in a manner which avoids substantial direct contact between adjacent streams of said fluid moving in opposite directions.

7. A hydrostatic bearing according to claim 6 in which said guide means comprise a baffle within said recess.

8. A hydrostatic bearing according to claim 6 in which said guide means comprise a recirculation conduit exterior to said recess.

9. A hydrostatic bearing according to claim 6 in which the structure of said recess is streamlined to match the said circulatory movement within said recess.

10. A hydrostatic bearing comprising:
first and second cooperating bearing members;
two confronting surfaces, presented respectively by said first member and said second member;
said confronting surfaces being adapted in use to be held apart by a film of fluid moving under hydrostatic force;
said members being adapted to move relative to each other in a predetermined direction so that said movement in use by said film of fluid is transverse relative to said predetermined direction across at least parts of said confronting surfaces; and
channels, aligned with said predetermined direction, formed in at least said parts of at least one of said confronting surfaces;
and comprising a recess formed in the said first of said cooperating bearing members and supplied in use with fluid under hydrostatic pressure, whereby in use said film of fluid issues from said recess, and comprising guide means cooperating with said recess whereby circulatory movement of said fluid within said recess due to friction from said confronting surface of said second cooperating bearing member is conducted in a manner which avoids substantial direct contact between adjacent streams of said fluid moving in opposite directions.

11. A hydrostatic bearing according to claim 10 in which said guide means comprise a baffle within said recess.

12. A hydrostatic bearing according to claim 10 in which said guide means comprise a recirculation conduit exterior to said recess.

13. A hydrostatic bearing according to claim 10 in which the structure of said recess is streamlined to match the said circulatory movement within said recess.

14. A hydrostatic bearing according to claim 10, in the form of a linear bearing, in which the bearing recess is supported by one of said members and said channels are formed in one of said confronting surfaces in locations lying transversely of the path travelled by said recess in use.

15. A hydrostatic bearing according to claim 10 in the form of a journal bearing in which said two members are a shaft and a surrounding annular member, including a plurality of said recesses formed in the first of said members so as to confront the second of said members radially, and in which said channels are formed circumferentially in one side of said members.

16. A hydrostatic bearing according to claim 10 in the form of a thrust bearing in which said two members are mutually rotatable and in which said two confronting surfaces are axially-facing, and in which said channels are formed in one of said confronting surfaces and are circular.

17. A hydrostatic bearing according to claim 10 in which adjacent said channels are separated by a land, and in which the width of said land is of the order of one-tenth of the pitch of said channels.

* * * * *

UNITED STATES PATENT AND TRADEMARK OFFICE
CERTIFICATE OF CORRECTION

PATENT NO. : 4,307,918
DATED : December 29, 1981
INVENTOR(S) : Mohamed Ezzat Mohsin It is certified that error appears in the above-identified patent and that said Letters Patent are hereby corrected as shown below:

In column 2, line 50, change "4" to --14--.

Signed and Sealed this

Seventh Day of September 1982

[SEAL]

Attest:

GERALD J. MOSSINGHOFF

Attesting Officer     Commissioner of Patents and Trademarks